April 17, 1962 C. P. CLEMENS 3,029,553
NOISEMAKING ATTACHMENT FOR A BICYCLE
Filed July 1, 1960 2 Sheets-Sheet 1

INVENTOR.
CAL P. CLEMENS,
BY
McMorrow, Berman & Davidson
ATTORNEYS.

April 17, 1962 C. P. CLEMENS 3,029,553
NOISEMAKING ATTACHMENT FOR A BICYCLE
Filed July 1, 1960 2 Sheets-Sheet 2

INVENTOR.
CAL P. CLEMENS,
BY
McMorrow, Berman & Davidson
ATTORNEYS.

United States Patent Office 3,029,553
Patented Apr. 17, 1962

3,029,553
NOISEMAKING ATTACHMENT FOR A BICYCLE
Cal P. Clemens, Box 115, Kent, Oreg.
Filed July 1, 1960, Ser. No. 40,284
2 Claims. (Cl. 46—175)

The present invention relates to toys generally and in particular to a noisemaking attachment for a bicycle.

In the past, juvenile operators of bicycles have devised many types of noisemakers for attachment to their bicycles. Some of the attachments are designed to engage the spokes of the bicycle wheels, other attachments, such as sirens or the like, are driven from the periphery of one of the wheels. The attachments that are designed to engage the spokes of the wheels of the bicycle are not successful, for the reason that they tend to loosen the spokes of the wheels. Sirens, or the like, which are driven from the periphery of one of the bicycle wheels are not satisfactory for the reason that the sirens are loud, shrill, disturbing to most people, and frequently are forbidden by the law enforcement officials of the area in which the bicycle is used.

An object of the present invention is to provide a noisemaking attachment for a bicycle which lends itself to the production of an audible staccato sound, not unlike the sound of the exhaust of an automobile engine.

Another object of the present invention is to provide a noisemaking attachment for a bicycle which lends itself to ready installation upon a bicycle with little alteration to the bicycle, and one which is highly effective in action.

A further object of the present invention is to provide a noisemaking attachment for a bicycle which may be manufactured so as to have more than one reverberating air tube, one which is sturdy in construction and simple in structure, and one which is economically feasible.

These and other objects and advantages of the present invention will become fully apparent from the following description when taken in conjunction with the annexed drawings, in which.

Figure 1:
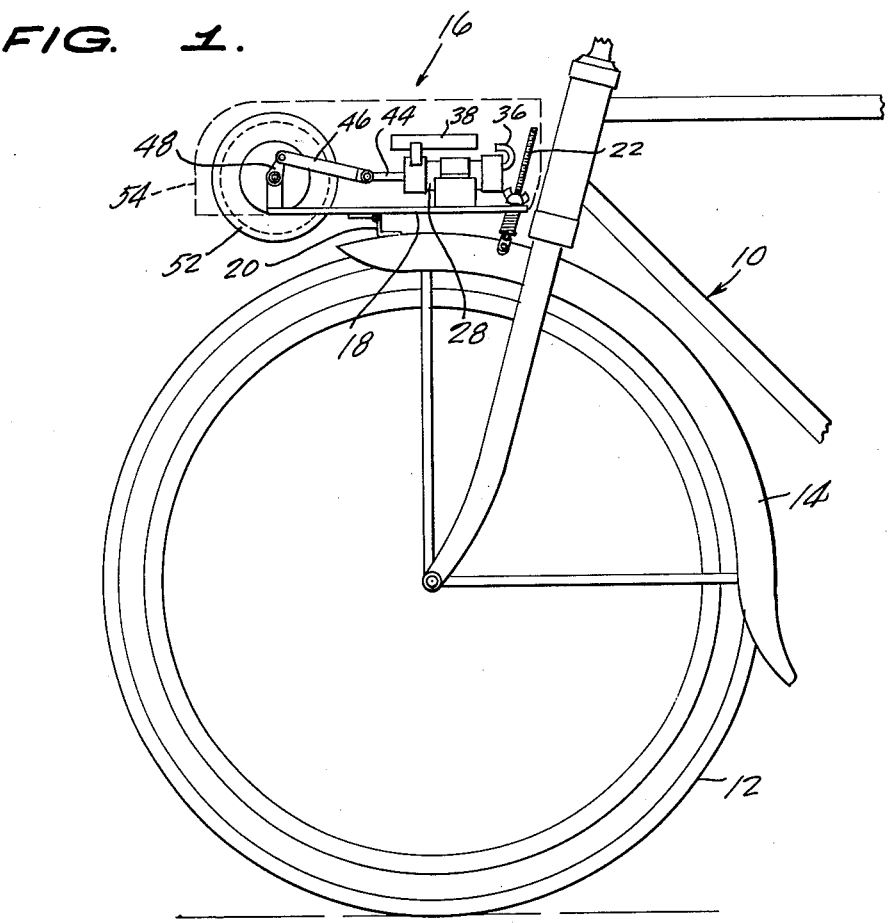
FIGURE 1 is a side elevational view of the forward end portion of a bicycle with the noisemaking attachment of the present invention installed thereon, the dotted line showing indicating a cover for the attachment.
Figure 2:
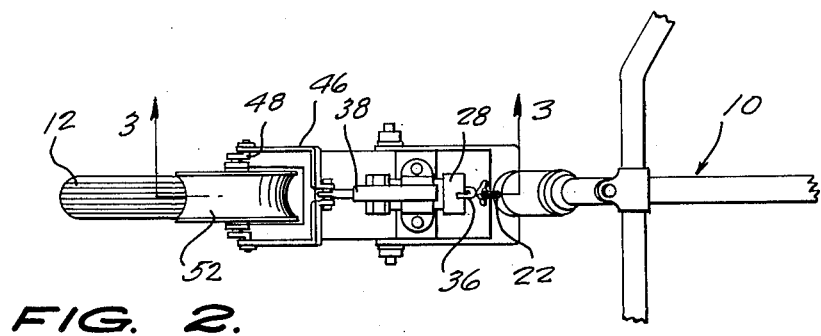
FIGURE 2 is a top plan view of the assembly shown in FIGURE 1.

Referring in greater detail to the drawings in which like numerals indicate like parts throughout the several views, in FIGURES 1 and 2 the numeral 10 designates generally a bicycle frame having a front wheel 12 supported thereon. Carried by the frame and partially circumposed about the wheel 12 is a mudguard 14.

The noisemaking attachment of the present invention is designated generally by the reference numeral 16 and it comprises a base 18 supported intermediate its ends by a hinge element 20 to the forward part of the mudguard 14.

Figure 3:
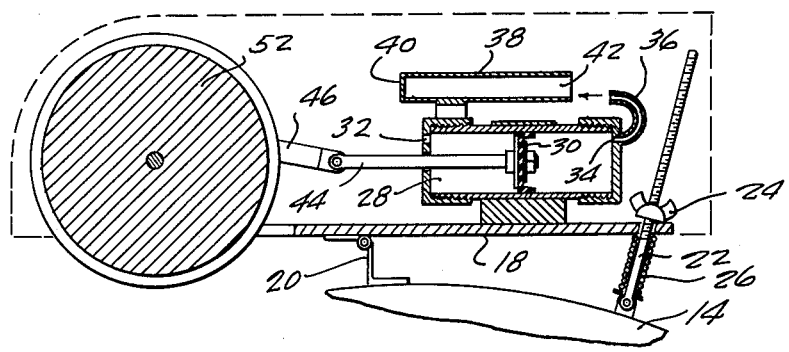
FIGURE 3 is a view, on an enlarged scale, taken on the line 3—3 of FIGURE 2, the drive roller being shown out of engagement with the periphery of the bicycle wheel.
Figure 4:
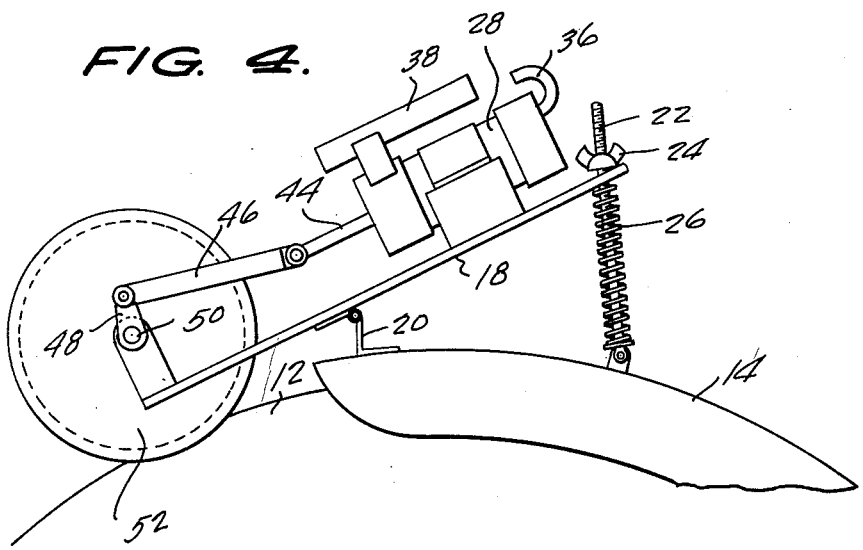
FIGURE 4 is a view similar to FIGURE 3 with the drive wheel in engagement with the periphery of the bicycle wheel.

The rearward end portion of the base 18 is connected to the mudguard 14 by means of a pivotally-mounted bolt 22 having a wing nut 24 threaded thereon. Between the mudguard 14 and the adjacent part of the base 18 is a coil spring 26 circumposed about the adjacent portion of the bolt 22 and biasing the base 18 for tilting movement in a counterclockwise direction, as shown in FIGURES 3 and 4.

Carried on the base 18 rearwardly of the hinge element 20 is an air-ejection means embodying a piston chamber 28 and a piston 30 working in the chamber 28.

The chamber 28 is provided at one end with an air inlet 32, and at the other end with an air outlet 34 to which a semicircular conduit 36 is connected in communication therewith.

An audible sound-generating element or tube 38 is disposed in the path of a gust of air when the latter is emitted from the free and open end of the conduit 36. The tube has one end closed, as at 40, and the other end open, as at 42, and is disposed so that the conduit 36 direct a flow of air across the mouth of the tube 38 adjacent the open end 42 thereof.

A piston rod 44 has one end secured to the piston 30 and has its other end exteriorly of and forwardly of the piston chamber 28 and is pivotally connected by a link element 46 to the free end of a crank arm 48 drivably connected to the shaft 50 of a roller 52.

As shown in FIGURE 2, the link element 46 and crank arm 48 are duplicated, so that there is one of each on both sides of the roller 52.

The roller 52 constitutes means operatively connected to the piston 30 and piston chamber 28 for effecting the emission of gusts of air from the chamber 28. The roller 52 is actuable, upon contacting engagement with the periphery of the wheel 12, to impart reciprocatory movement to the piston 30 so as to draw air in through the inlet 32 and eject it through the outlet 34 and conduit 36 against the end of the tube 38 when the wheel 12 executes its rotary movement when being driven over a ground surface by an occupant of the bicycle.

In FIGURE 1, the reference numeral 54 designates the outline of a cover which may be employed to shield and conceal the noisemaking attachment of the present invention, if desired.

In use, the base 18 is quickly and with facility mounted upon the mudguard 14 with the roller 52 out of engagement with the wheel 12. When it is desired to use the attachment, the wing nut 24 is loosened so that the spring 26 is permitted to shift the base 18 to the position shown in FIGURE 4, in which the wheel 12 is engaged by the roller 52.

Upon rolling movement of the bicycle over a ground surface, the piston 30 will reciprocate within the chamber 28 and will draw air into the inlet 32 and discharge the same out of the conduit 36 across the edge of the open end 42 of the tube 38.

This results in the production of a resonant noise or sound emitted from the open end of the tube 38, the sound coming in sharp pulses or gusts, and resembling the staccato sound of an automobile exhaust.

What is claimed is:

1. A noisemaking attachment comprising a base adapted to be mounted on a bicycle frame adjacent one of the rotatable ground-engaging wheels, an injection means on said base and embodying a piston chamber having opposed ends, an air inlet in one of said ends, an arcuate air outlet conduit projecting from the other end of said ends, a piston working within said chamber between the ends thereof, a piston rod extending through one end of said chamber and having one end secured to said piston and having the other end exteriorly of said one end of said chamber, an audible sound-generating element embodying a tube having one end closed and the other end open disposed so that the open end is in the path of movement of a gust of air emitted from said conduit, and means embodying a roller operatively connected to the other end of said piston rod for effecting the emission of gusts of air from said conduit, said roller being actuable upon contacting engagement with the periphery of said one wheel while the latter wheel effects its rotary movement when the base is mounted on said bicycle frame.

2. A noisemaking attachment comprising a base adapted to be mounted on a bicycle frame adjacent one of the rotatable ground-engaging wheels, air injection means on said base and embodying a piston chamber having opposed ends, an air inlet in one of said ends, an arcuate air outlet conduit projecting from the other of said ends, and a piston working within said chamber between the ends thereof, an audible sound-generating element embodying a tube having one end closed and the other end open disposed so that the open end is in the path of movement of a gust of air emitted from said conduit, and means embodying a roller operatively connected to said piston for effecting the emission of gusts of air from said chamber, said roller being actuable upon contacting engagement with the periphery of said one wheel while the latter wheel effects its rotary movement when the base is mounted on said bicycle frame.

References Cited in the file of this patent

UNITED STATES PATENTS 585,529     Madden _____ June 29, 1897

FOREIGN PATENTS 81,859     Switzerland _____ July 16, 1919